(12) United States Patent
Lehtinen et al.

(10) Patent No.: US 9,147,270 B1
(45) Date of Patent: *Sep. 29, 2015

(54) BOUNDING PLANE-BASED TECHNIQUES FOR IMPROVED SAMPLE TEST EFFICIENCY IN IMAGE RENDERING

(75) Inventors: Jaakko Lehtinen, Helsinki (FI); Timo Aila, Helsinki (FI); Samuli Laine, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 783 days.

This patent is subject to a terminal disclaimer.

(21) Appl. No.: 13/168,773

(22) Filed: Jun. 24, 2011

(51) Int. Cl.
*G06T 15/00* (2011.01)
*G09G 5/00* (2006.01)
*G06T 11/20* (2006.01)

(52) U.S. Cl.
CPC ..................................... *G06T 11/20* (2013.01)

(58) Field of Classification Search
None
See application file for complete search history.

(56) References Cited

U.S. PATENT DOCUMENTS

| | | | |
|---|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |
| 5,737,027 A | 4/1998 | Demos |
| 5,809,219 A | 9/1998 | Pearce et al. |
| 5,870,096 A | 2/1999 | Anjyo et al. |
| 5,973,700 A | 10/1999 | Taylor et al. |
| 5,982,385 A | 11/1999 | Fish et al. |
| 6,034,667 A | 3/2000 | Barrett |
| 6,211,882 B1 | 4/2001 | Pearce et al. |
| 6,300,956 B1 | 10/2001 | Apodaca et al. |

(Continued)

FOREIGN PATENT DOCUMENTS

| | | |
|---|---|---|
| CN | 1856805 | 11/2006 |
| WO | 2012115711 | 8/2012 |

OTHER PUBLICATIONS

Hou, Q., et al, "Micropolygon Ray Tracing with Defocus and Motion Blur," ACM Transactions on Graphics (TOG), vol. 29, Article 64, Jul. 2010, pp. 1-10.

(Continued)

*Primary Examiner* — Ryan R Yang (57) ABSTRACT

A method for reducing the number of samples tested for rendering a screen space region of an image includes constructing a trajectory of a primitive in a three dimensional coordinate system, the coordinate system including a screen space dimension, a lens dimension and a time dimension. A bounding volume is constructed for a screen space region which is to be rendered, the bounding volume overlapping a portion of the screen space region. The bounding volume is defined according to a plurality of bounding planes which extend in the three dimensional coordinate system, whereby the bounding planes are determined as a function of the trajectory of the primitive. One or more sample points which are located within the screen space region, and which are not overlapped by the bounding volume are excluded from testing.

30 Claims, 6 Drawing Sheets

(56) References Cited

U.S. PATENT DOCUMENTS

| | | |
|---|---|---|
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1 | 5/2003 | Schmidt et al. |
| 2003/0234789 A1* | 12/2003 | Gritz .................. 345/474 |
| 2006/0101242 A1 | 5/2006 | Siu et al. |
| 2007/0046686 A1 | 3/2007 | Keller |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1* | 8/2012 | Clarberg et al. .............. 345/420 |
| 2012/0293515 A1* | 11/2012 | Clarberg et al. .............. 345/441 |
| 2012/0327071 A1 | 12/2012 | Laine et al. |
| 2013/0321420 A1 | 12/2013 | Laine et al. |

OTHER PUBLICATIONS

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

P. Haberli and K. Akeley, "The Accumulation Buffer: Hardware Support for High Quality Rendering," In Proc. SIGGRAPH 1990. pp. 309-318.

Tomas Akenine-Möller, Jacob Munkberg, and Jon Hasselgren, "Stochastic rasterization using time-continuous triangles," Proc. Graphics Hardware 2009.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Moller., et al., "Stochastic Rasterization Using Time-Continuous Triangles," ACM, Jan. 2007, pp. 1-11.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal of WSCG 15: 51-58, 2007.

Schaufler, et al; "Ray Tracing Point Sampled Geometry", In Proceedings of the Eurographics Workshop on Rendering Techniques 2000, p. 319-328, London, UK, 2000. Springer-Verlag.

* cited by examiner

BOUNDING PLANE-BASED TECHNIQUES FOR IMPROVED SAMPLE TEST EFFICIENCY IN IMAGE RENDERING

CROSS REFERENCE TO RELATED APPLICATIONS

This application is concurrently filed with the following commonly-owned patent applications, each of which is incorporated by reference in its entirety for all purposes:

U.S. patent application Ser. No. 13/168,765, filed Jun. 24, 2011, entitled "System and Method for Improved Sample Test Efficiency in Image Rendering," and U.S. patent application Ser. No. 13/168,771, filed Jun. 24, 2011, entitled "Bounding Box-Based Techniques for Improved Sample Test Efficiency in Image Rendering,".

BACKGROUND

The present invention relates to image rendering, and more particularly to improving sample test efficiency in image rendering applications.

The rendering of a high quality image relies upon an accurate color computation for each pixel forming the image. The accuracy of this color computation is improved by distributing sample points across each pixel, testing which sample points are overlapped by a primitive which is to be rendered in the image, and computing a color for the pixel based upon those overlapped and non-overlapped sample points.

Sample testing algorithms (sometimes referred to as "point in polygon tests") determine which samples of a screen space region (usually a pixel) are overlapped by a primitive, and the quality of such algorithms can be based upon their "sample test efficiency" (STE), this term referring to the number of sample points overlapped by a primitive versus the number of sample points tested for a given screen space region, e.g. a pixel. A high STE indicates an efficient sample testing algorithm, as a high percentage of the test sample points were actually or possibly overlapped by the primitive.

Techniques for improving STE are useful in the contexts of motion blur and depth of field rendering effects, as both types of effects involve a primitive potentially traversing a large number of pixels, resulting in a potentially large number of sample points which have to be considered for testing.

Motion blur results when the camera and/or geometry move while the virtual camera shutter is open. While the motion can theoretically be arbitrary during the exposure of a frame, it has been observed in film industry that vertex motion can often be satisfactorily simplified by assuming linear motion between shutter open (t=0) and closed (t=1).

In stochastic rasterization, the frame buffer is generalized so that each sample has additional properties in addition to the screen-space (x,y) position. In order to support motion blur, a time value is assigned to each frame buffer sample. In absence of motion, the frame buffer behaves exactly as it does currently, providing spatial antialiasing. With motion, a sample is updated only when a triangle overlaps the sample at the time of the sample.

The prior art describes several ways of interpolating a triangle to a specified time. One approach is as described in "The Accumulation Buffer: Hardware Support for High Quality Rendering," P. Haberli and K. Akeley, Proc. SIGGRAPH 1990, pgs. 309-318, and in "Data-Parallel Rasterization of Micropolygons with Defocus and Motion Blur," K. Fatahalian, E. Luong, S. Boulos, K. Akeley, W. Mark, and P. Hanrahan, Proc. High Performance Graphics 2009. This approach involves interpolating the vertices of a primitive in homogeneous clip space before triangle setup, and therefore a separate triangle setup/rendering pass is required for each distinct time. While simple to implement, this approach may not scale to a large number of samples per pixel, and the image quality can suffer due to a fixed (typically small) set of unique time values.

A second conventional approach has been to identify the screen-space bounds for the "time-continuous triangle" (TCT) for the entire exposure time, and then test all samples in all covered pixels by interpolating the triangle to the current sample's time, as described in disclosed in "Stochastic rasterization using time-continuous triangles," T. Akenine-Möller, J. Munkberg, and J. Hasselgren, Proc. Graphics Hardware 2009. Possible implementations include at least time-continuous edge functions (about 3× the cost of traditional 2D edges) and ray-triangle intersection. TCTs offer high image quality because a unique time value can be set to each sample, but an accompanying disadvantage is low STE. When a triangle moves quickly, it can cover a relatively large region on the screen, yet at the same time we expect it to cover approximately a constant number of samples regardless of motion. STE therefore degrades drastically for fast motion, and can be as low as 1% in realistic cases.

A third approach is described in U.S. Pat. No. 4,897,806, whereby exposure time is split into several strata (typically, the number of strata equals the number of samples per pixel), and the above-mentioned second approach is called for each strata. This improves STE significantly, but the efficiency of the solution is not optimal for the low sampling densities typically encountered in fast rendering graphics (4-16 samples/pixel).

In view of the shortcomings of the conventional approaches, a new method for providing improved sample test efficiency in image rendering is needed.

SUMMARY

A system, method, and computer program product for reducing the number of samples tested for rendering a screen space region of an image is presented herein. The method includes constructing a trajectory of a primitive in a three dimensional coordinate system, the coordinate system including a screen space dimension, a lens dimension and a time dimension. A bounding volume is constructed for a screen space region which is to be rendered, the bounding volume overlapping a portion of the screen space region. The bounding volume is defined according to a plurality of bounding planes which extend in the three dimensional coordinate system, whereby the bounding planes are determined as a function of the trajectory of the primitive. One or more sample points which are located within the screen space region, and which are not overlapped by the bounding volume are excluded from testing.

The foregoing method finds particular application in the rendering of images, an exemplary method of which includes the aforementioned operations, and the additional operations of identifying a screen space region which is to be rendered, testing sample points which are located within the screen space region and which are overlapped by the bounding volume of the primitive, and rendering the screen space region based upon the tested sample points.

These and other features of the invention will be better understood in view of the following drawings and detailed description of exemplary embodiments.

BRIEF DESCRIPTION OF THE DRAWINGS

For clarity, previously described features retain their reference indices in subsequent figures.

DETAILED DESCRIPTION OF EXEMPLARY EMBODIMENTS

Current hardware rasterizers rely on approximations of a pinhole camera and infinitesimal exposure time for efficiency, an accordingly motion blur and depth of field effects are missing from the rendered images. If finite aperture and exposure time are assumed, the screen-space vertex positions become dependent on the amount of motion during the exposure time as well as the amount of defocus blur. The latter is a simple function of depth, and its shape is typically a circle. An exemplary model is $$\text{VertexPosition}(t,u,v) = \text{VertexPosition}_{t=0,u=0,v=0} + \text{MotionVector} * (t) + \text{CircleOfConfusionRadius} * (u,v) \quad \text{eq. (1)}$$

The typical approach for rasterizing triangles defined by three such vertices consists of two stages. At the first stage, all pixels that may be covered for some combination of lens position and time during exposure are identified. This is typically implemented by computing minimum and maximum x and y bounds from the equation above, for valid ranges of t, u and v. In certain cases it can be beneficial to determine a tighter but more complicated bounding shape, especially when motion blur is much stronger than defocus blur.

At the second stage, the pixels that fall within the bounding shape are identified, and the sample points included therein are tested for coverage. Each sample has a predefined (u,v,t) in addition to the traditional (x,y) subpixel offset. The actual coverage test can be implemented in various ways, for example using a ray-triangle intersection test, or high-dimensional edge functions in a pixel shader. These tests are computationally expensive to execute, and thus it is advantageous to exclude as many samples as possible without compromising correctness. A triangle can be expected to cover roughly a constant number of samples regardless of the amount of motion or defocus, and yet the screen-space bounds can grow significantly due to motion and defocus, leading to a significant amount of redundant work and low sample test efficiency (STE).

The commonly-owned, concurrently filed U.S. patent application Ser. No. 13/168,765, filed Jun. 24, 2011, entitled "System and Method for Improved Sample Test Efficiency in Image Rendering" and U.S. patent application Ser. No. 13/168,771, filed Jun. 24, 2011, entitled "Bounding Box-Based Techniques for Improved Sample Test Efficiency in Image Rendering" each present methods for computing t-, u- and v-bounds [$t_{min},t_{max}$],[$u_{min},u_{max}$] and [$v_{min},v_{max}$] for a particular screen space region, e.g., a pixel/tile on the screen. Once these parameter bounds are known, the number of samples tested can be reduced to those that are within the computed non-screen space (u,v,t) bounds.

However, while motion or defocus can be optimized independently, concurrent motion and defocus may cause reduced efficiency. This is because motion (t) and defocus (u,v) both cause apparent movement on the screen, which means that the same object point may project to the same (x,y) screen location from multiple different (u,v,t) coordinates, effectively coupling the t axis with the u and v axes. This multiple-valuedness inflates the [$t_{min},t_{max}$], [$u_{min},u_{max}$] and [$v_{min},v_{max}$] bounds, resulting in an increased t range to account for the worst-case effect of the lens, Similarly, increased u, v ranges would be needed to account for the worst-case effect of motion, leading to less than ideal STE.

To address this problem, the construction of a bounding volume in two new coordinate systems of (t,u,x) and (t,v,y) is proposed. A bounding volume in the (t,u,x) and (t,v,y) systems is defined by an upper bounding plane and lower bounding plane in each of the of new coordinate (t,u,x) and (t,v,y) systems.

Under the assumptions made in Equation (1), the x coordinate of a given object point is an affine function of t and u, i.e., its image in (t,u,x) coordinates is a plane. Similarly, the y coordinate of the object point is an affine function of t and v and its image in (t,v,y) coordinates is a plane. The skilled person will appreciate that other models exists for determining vertex positions of a primitive, and the present invention is equally applicable to those models.

Figure 1A:
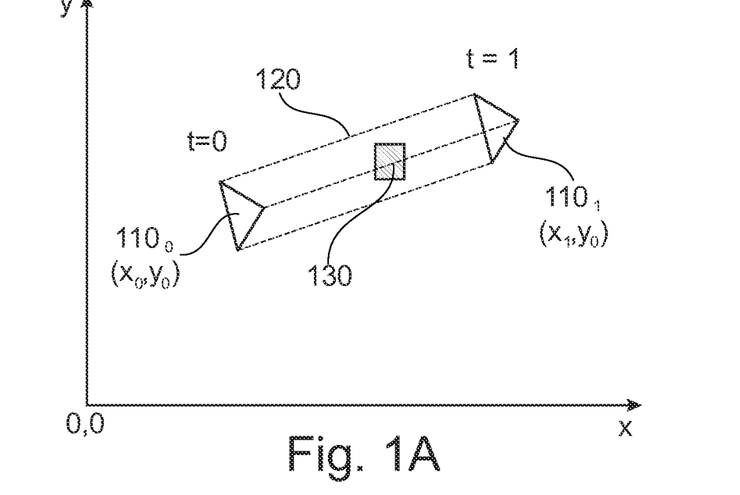
FIG. 1A illustrates a triangle moving in screen space as a function of time in accordance with the present invention.
Figure 1B:
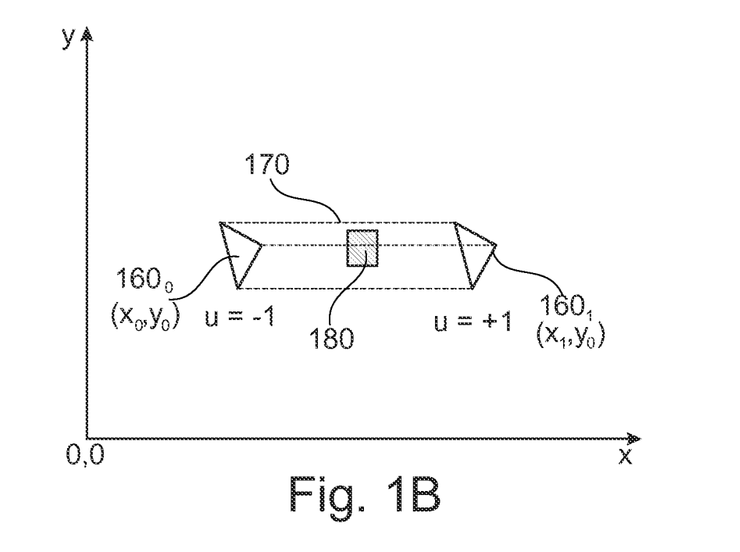
FIG. 1B illustrates a triangle exhibiting apparent motion in screen space as a function of horizontal lens dimension (u) in accordance with the present invention.
Figure 2:
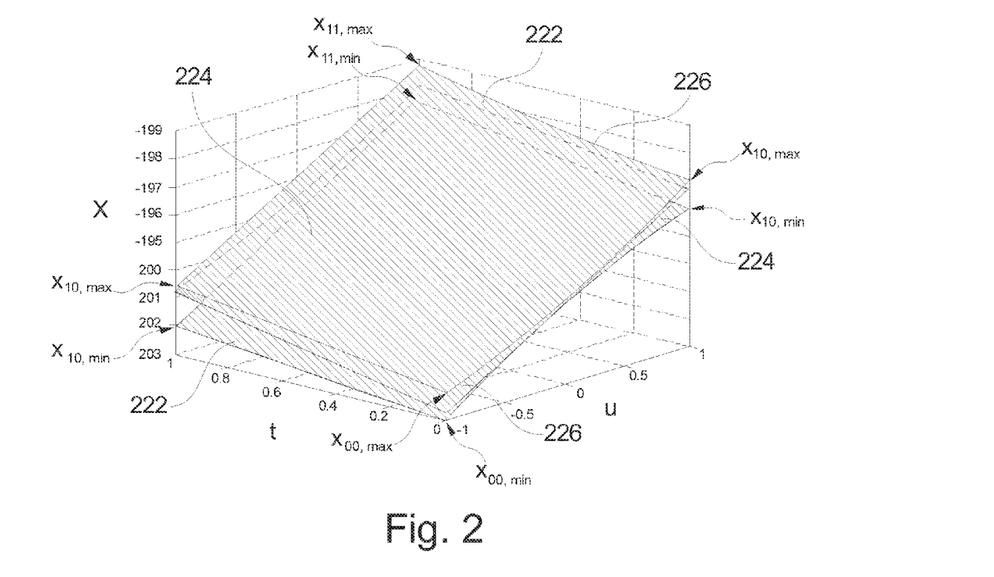
FIG. 2 illustrates surfaces formed from vertices of the triangle shown in FIGS. 1A and 1B within a (t,u,x) coordinate system in accordance with the present invention.
Figure 3:
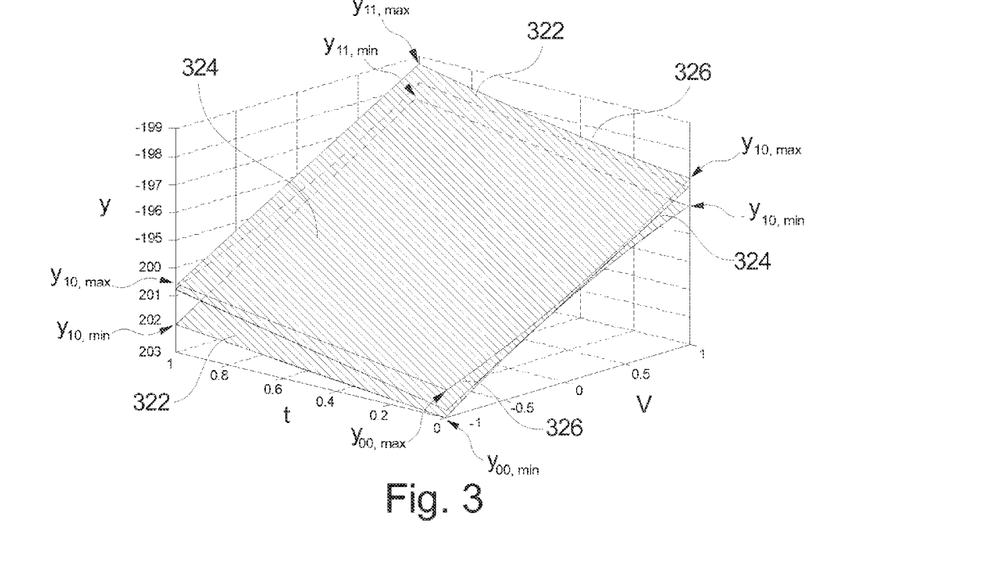
FIG. 3 illustrates surfaces formed from vertices of the triangle shown in FIGS. 1A and 1B within a (t,v,y) coordinate system in accordance with the present invention.

For background, FIGS. 1A and 1B illustrate a triangle in two dimensional coordinate systems, exemplary (t,x) and (t,u), respectively. Next, FIGS. 2 and 3 are presented each of which illustrate the triangle's trajectory in the new (t,u,x) and (t,v,y) coordinate systems. From the teaching of the present invention it will understood that while complete (x,y,u,v,t) space of a primitive is five-dimensional, the problem of determining the position of the primitive can be separated into two three dimensional problems corresponding to the (t,u,x) and (t,v,y) coordinate systems described herein.

FIG. 1A illustrates a triangle in screen space in accordance with the present invention. The triangle 110 is shown at position ($x_0,y_0$) at time index t=0, and position ($x_1,y_1$) at time index t=1, the triangle 110 identified with the references $110_0$ and $110_1$ to indicate their respective time indices. The triangle 110 undergoes motion during the time interval t=0 and t=1, the term "motion" or "screen space motion" referring to both actual motion of a primitive or apparent motion of the primitive. Screen space motion of the triangle illustrated in FIG. 1A is an embodiment of actual motion, that is, the triangle's motion in screen space occurs as a function of time, and not as a result of viewing the triangle from different lens positions (u,v), an example of which is described below.

The triangle's motion is further characterized as having a trajectory 120 extending between the triangles $110_0$ and $110_1$. As used herein, the trajectory 120 determines a region on the screen for any (u,v,t) coordinates, so that the screen space region bounds the primitive at those particular (u,v,t) coordinates. As such, the trajectory 120 includes screen space dimensions (x,y) and a non-screen space dimension (u,v, t,), and more particularly in the present invention two non-screen space dimensions, either (u,t) or (v,t). As shown, the trajectory 120 defines the possible screen space paths along which the triangle 110 can take during the time span t=0 to t=1. The triangle 110 may include lens dimension coordinates (u,v) alternative or in addition to the time dimension (t). As used herein, the term "screen space" refers to the conventionally-known screen space of the image, the space being defined in the convention in the (x,y) dimension coordinate system. The term "non-screen space" refers to a space which is not included in the screen space of the image. Examples of such spaces/dimensions include time (t) and lens dimensions (u,v).

As shown, the trajectory 120 intersects a screen space region 130 (referred to herein as a "tile" for brevity), which may be any region in the screen space which is to be rendered, e.g., a pixel whose color/reflectance/transmittance is to be determined. The trajectory's intersection of the tile 130 indicates that the triangle may (but not necessarily) intersect the tile.

It will be understood by the skilled person that the foregoing example applies equally to a description of a primitive with respect to horizontal and vertical lens dimensions (u,v), as viewing the primitive from different lens positions (u,v) will result in apparent motion of the primitive in the screen space, such apparent motion intersecting the tile 130. In this case, each frame buffer sample point is further indexed with a lens position (u, v). Depth of field is related to motion blur in the sense that when the viewing position on the lens is moved to the left or the right, this causes only horizontal movement of the vertices, and similarly for vertical movement. That is, a change in the horizontal lens coordinate (u) results in apparent movement of the primitive only in the horizontal direction, and a change in vertical lens coordinate (v) results in apparent movement of the primitive only in the vertical direction.

FIG. 1B illustrates a triangle exhibiting apparent motion in screen space as a function of horizontal lens dimension (u) in accordance with the present invention. Triangle 160 is shown at each of two x-positions ($x_0$) and ($x_1$) relative to two different horizontal lens positions u=−1 and u=+1, the triangle 160 identified with the references $160_0$ and $160_1$ to indicate their respective lens positions. The screen space motion of the triangle is "apparent" in this instance, as the triangle does not actual move in time, but rather its position is shifted, depending upon the lens position (u) from which it is viewed. Further particularly, the triangle 160 exhibits a screen space trajectory 170 which intersects the screen space region/tile 180 over some range of the horizontal lens dimension (u)

FIG. 2 illustrates surfaces formed from three vertices of the triangle shown in FIGS. 1A-1C in accordance with the present invention. The vertices form vertex surfaces 222, 224 and 226, each of which extend within a new (t,u,x) coordinate system over the time span [$t_0,t_1$], horizontal lens dimension [$u_{-1},u_{+1}$], and x-dimension In particular, each vertex surface 222, 224 and 226 is formed by a respective one of the vertices of the triangle as the vertex moves (actual or apparent motion) through its (t,u,x) range. In addition, one or more of the vertex surfaces 222, 224 and 226 may be tilted with respect to time (t) or the horizontal lens dimension (u) if the vertex has horizontal motion or horizontal defocus, respectively. In such a case, two or more vertex surfaces may intersect because the surfaces' dependency on (t) and (u) may change the relative ordering of the vertices as they are seen on screen.

A trajectory of the triangle's motion in the x-plane can be determined from the FIG. 2. In one embodiment, minimum x-plane extents and maximum x-plane extents are identified from among the three vertex surfaces over all four corners of the (t,u) space, points $x_{00,min}$, $x_{01,min}$, $x_{10,min}$, and $x_{11,min}$, $x_{00,max}$, $x_{01,max}$, $x_{10,max}$, and $x_{11,max}$ identified in the illustrated embodiment. A lower trajectory boundary is then constructed by connecting the minimum x-plane extents, and an upper trajectory boundary constructed by connecting the maximum x-plane extents. A linear approximation can be made to connect the extents, although any function may be applied to define the trajectory's boundaries. The trajectory's upper and lower boundaries form the primitive's trajectory in the x-plane, defining the possible paths which the triangle 110 may take.

Although not shown, the primitive's trajectory intersects a screen space region (in this instance, along the x-plane), and thus the testing of samples within the region is necessary to render the tile 130. Exemplary, a bounding volume corresponding to the region between the upper and lower trajectory portions is constructed by limiting the x,y coordinates to lie within the screen space region which is to be rendered.

FIG. 3 illustrates surfaces formed from three vertices of the triangle shown in FIGS. 1A and 1B in accordance with the present invention. The vertices form vertex surfaces 322, 324 and 326, each of which extend within a new (t,v,y) coordinate system over the time span [$t_0,t_1$], vertical lens dimension [$v_{-1},v_{+1}$], and the y-dimension. In particular, each vertex surface 322, 324 and 326 is formed by a respective one of the vertices of the triangle as the vertex moves (actual or apparent motion) through its (t,v,y) range. One or more of the vertex surfaces may be tilted with respect to time (t) or the vertical lens dimension (v) if the corresponding vertex has vertical motion or vertical defocus, respectively.

As above in FIG. 2, a screen space trajectory of the triangle's motion in the y-plane can be determined, where in an exemplary embodiment minimum y-plane extents and maximum y-plane extents are identified from among the three vertex surfaces over all four corners of the (t,v) space, points $y_{00,min}$, $y_{01,min}$, $y_{10,min}$, and $y_{11, min}$, $y_{00,max}$, $y_{01, max}$, $y_{10,max}$, and $y_{11, max}$ identified in the illustrated embodiment. A lower trajectory boundary is then constructed by connecting the minimum y-plane extents, and an upper trajectory boundary constructed by connecting the maximum y-plane extents. A linear approximation can be made to connect the extents, although any function may be applied to define the trajectory's boundaries. The trajectory's upper and lower boundaries form the primitive's trajectory in the y-plane, defining the possible paths which the triangle 110 may take.

Although not shown, the screen space trajectory intersects a screen space region (in this instance, along the y-plane), and thus the testing of samples within the region is necessary to determine the render the tile 130. Exemplary, a bounding volume corresponding to region located between the upper and lower trajectory portions is constructed by limiting the x,y coordinates to lie within the screen space region which is to be rendered.

Figure 4A:
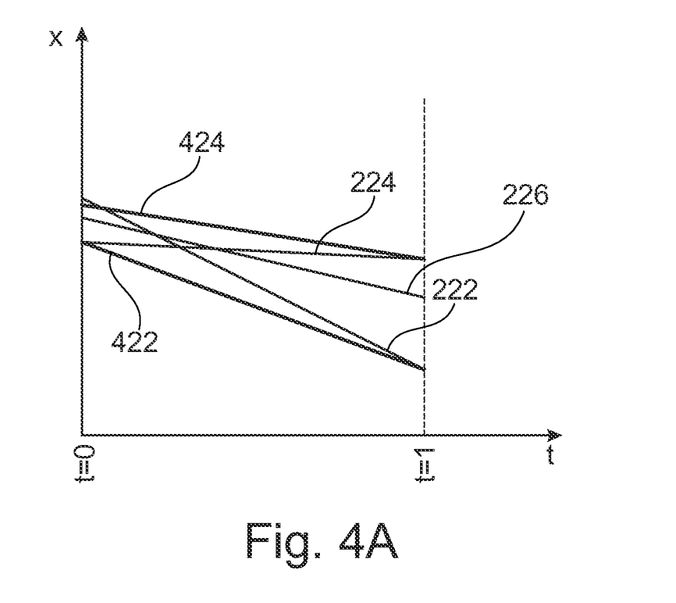
FIGS. 4A and 4B illustrate upper and lower bounding planes determined for each of the (t,u,x) and (t,v,y) coordinate systems in accordance with the present invention.
Figure 4B:
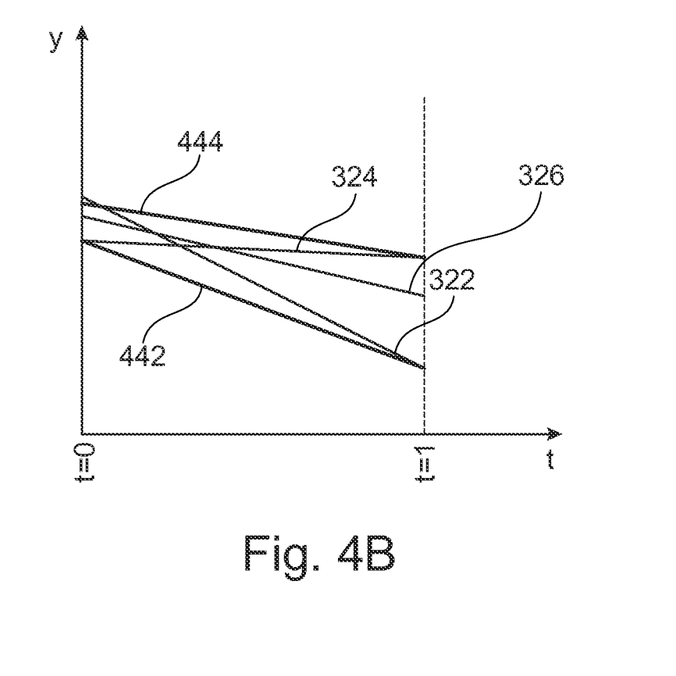

FIGS. 4A and 4B illustrate a two-dimensional cross-section view of the upper and lower bounding planes determined for each of the (t,u,x) and (t,v,y) coordinate systems in accordance with the present invention. FIG. 4A illustrates a cross section of FIG. 2 in which a (u) coordinate is selected, and the planes in FIG. 2 are intersected by the selected constant value of (u). FIG. 4A further includes a lower bounding plane 422 (referred herein as TUX,LO) and an upper bounding plane 424 (referred to herein as TUX,HI) for the (t,u,x) coordinate system. Bounding planes 422 and 424 are constructed by computing the minimum and maximum x coordinates at the four corners of the (t, u) rectangle and fitting a plane to these points, a process which can be performed, for example, during triangle setup.

FIG. 4B illustrates a cross section of FIG. 3 in which a (v) coordinate is selected and the planes in FIG. 3 are intersected by that constant value of (v). FIG. 4B further includes a lower bounding plane 442 (referred herein as TVY,LO) and an upper bounding plane 444 (referred to herein as TVY,HI) for the (t,v,y) coordinate system. Similarly, bounding planes 442 and 444 are constructed by computing the minimum and maximum y coordinates at the four corners of the (t, v) rectangle and fitting a plane to these points.

The TUX,LO, TUX,HI, TVY,LO and TVY,HI bounding planes 422, 424, 442 and 444 have the form:

$$A_{TUX,LO}*t+B_{TUX,LO}*u+x+C_{TUX,LO}>=0 \quad \text{eq. (2)}$$

$$A_{TUX,HI}*t+B_{TUX,HI}*u-X+C_{TUX,HI}>=0 \quad \text{eq. (3)}$$

$$A_{TVY,LO}*t+B_{TVY,LO}*v+y+C_{TVY,LO}>=0 \quad \text{eq. (4)}$$

$$A_{TVY,HI}*t+B_{TVY,HI}*v-y+C_{TVY,HI}>=0 \quad \text{eq. (5)}$$

where the A, B and C are constants determined during triangle setup. Because TUX, LO bounds the x coordinates of the vertices from below and TUX, HI from above, it is known that any visibility sample (x, y, u, v, t) where the TUX,LO plane equation evaluates to a negative value cannot possibly be covered the triangle, and similarly for the other planes. This gives a fast method for early culling samples using dot products before a more precise coverage test. Once a sample is determined to lie within the halfspaces defined by all four planes, the complete coverage test is performed using ray-triangle intersection or high-dimensional edge functions.

The bounding planes can also be seen as a X-Y screen bounding box that are affinely parametrized by u, v and t: after substituting a fixed (u, v, t) triplet into the plane equations, the remaining linear inequalities determine conservative X and Y bounds for the image of the triangle.

The axis-aligned coordinate ranges for a pixel at (X,Y), as presented in the commonly-owned concurrently filed U.S. patent application Ser. No. 13/168,771, filed Jun. 24, 2011, entitled "Bounding Box-Based Techniques for Improved Sample Test Efficiency in Image Rendering" can be computed by intersecting the TUX (respectively, TVY) planes with the slab X=<x=<X+1 (respectively, Y=<y=<Y+1) and finding the minimum and maximum t, u (respectively, t, v) values along this intersection over the t, u rectangle. This can be imagined as slicing the vertex surfaces shown in FIG. 2 (respectively, FIG. 3) with planes whose normal points directly up at X and X+1 (respectively, at Y and Y+1). In such an embodiment, the tile/screen space region is a one pixel sized area of [X,X+1]x[Y,Y+1].

Figure 5A:
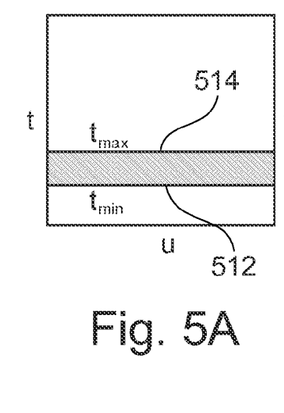
FIGS. 5A-5C illustrate exemplary bounding planes which are formed in the (t,u,x) coordinate system in accordance with the present invention.
Figure 5B:
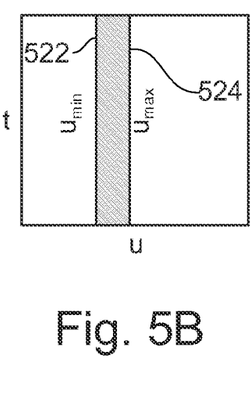
Figure 5C:
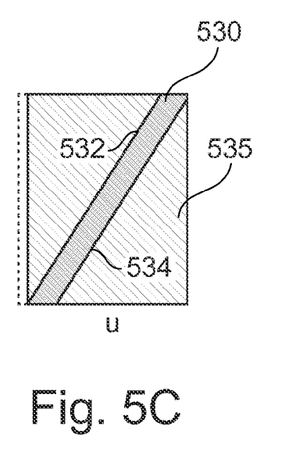

FIGS. 5A-5C illustrate exemplary bounding planes which are formed in the (t,u,x) coordinate system in accordance with the present invention. FIG. 5A illustrates exemplary bounding planes 512 and 514 when only motion is present, whereby the bounding planes 512 and 514 have a zero component in the u direction (respectively, in the v direction in a (t,v,y) coordinate system). In this instance, the B coefficient (of equations 2 and 3, above) is zero and the bounding planes 512 and 514 are tilted only with respect to time t. Accordingly, the intersection of the bounding planes 512 and 514 with the aforementioned slabs forms axis-aligned rectangles in (t, u) (respectively, (t, v)). The t-boundaries 512 and 514 of this rectangle correspond to the $[t_{min},t_{max}]$ range described in the Applicant's aforementioned Ser. No. 13/168,771, filed Jun. 24, 2011.

FIG. 5B illustrates an exemplary bounding planes 522 and 524 when only defocus is present, whereby the bounding planes 522 and 524 are tilted with respect to u (respectively, v in the (t,v,y) coordinate system). In this instance, the A coefficient (of equations 2 and 3, above) is zero and the bounding planes 522 and 524 are tilted only with respect to u (respectively, v in the (t,v,y) coordinate system). Accordingly, the intersection of the bounding planes 522 and 524 with the aforementioned slabs forms axis-aligned rectangles in (t, u) (respectively, (t, v)). The u-boundaries 522 and 524 of this rectangle correspond to the $[u_{min},u_{max}]$ range (respectively, the $[v_{min},v_{max}]$ range) described in the Applicant's aforementioned Ser. No. 13/168,771, filed Jun. 24, 2011.

FIG. 5C illustrates exemplary bounding planes 532 and 534 when both motion and defocus are present. In this example, the intersection is small, but not aligned with the coordinate axes, leading to a larger test sample range 535 (representing an axis-aligned bounds), and thus a lower sample test efficiency. The present invention provides a narrow sample test range 530 which operates to exclude/cull samples outside the actual intersection. This improvement comes at the price of per-sample dot products, indicating that the earlier axis-aligned bounds can still be used on a per-pixel level to limit testing of individual samples using the present method.

While equation (1) assumes a constant per-vertex circle of confusion, the methods described herein also applies the per-vertex circles of confusion are allowed to vary linearly in time. In particular, setting up the bounding planes can still be done using the same procedure that looks at the x and y coordinates of the vertices only at the corners of the (t,u,v) cube.

Further exemplary, the above equations 2-5 are similar to the typical 2D edge equations (Ax+By+D>=0). Accordingly, it would therefore be possible to extend the fixed-function edge function evaluators in a graphics pipeline to process plane equations 2-5 described herein. For example, the coefficients of the (t,u,x) and (t,v,y) bounding planes, as defined in Equations 2, 3, 4, and 5, can be described using a few bits, for example, 8 bits. In this sense, the simplifications are consistent with existing 2D edge equations, in which x and y have limited subpixel resolution.

Figure 6:
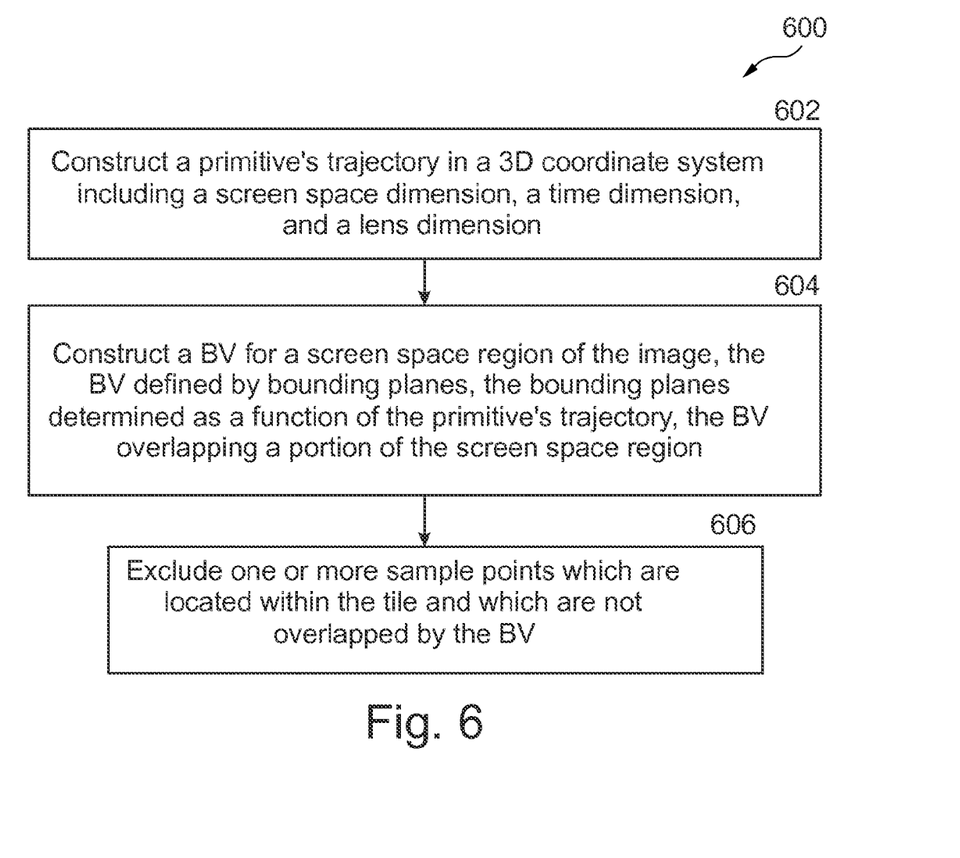
FIG. 6 illustrates an exemplary method for reducing the number of samples tested for rendering a region of an image in accordance with the present invention.

FIG. 6 illustrates a method for reducing the number of sample points tested for rendering a screen space region of an image. The method includes constructing a trajectory of a primitive in a three dimensional coordinate system, the coordinate system including a screen space dimension, a lens dimension and a time dimension at 602. At 604, a bounding volume is constructed for a screen space region which is to be rendered. The bounding volume is defined according to a plurality of bounding planes which extend in said three dimensional coordinate system, wherein the bounding planes are determined as a function of the trajectory of the primitive. Further particularly, the bounding volume overlaps a portion of the screen space region. At 606, one or more sample points which are located within the screen space region, and which are not overlapped by the bounding volume are excluded from testing.

In a first exemplary embodiment of operation 602, a trajectory is constructed of one or more vertices of the primitive in a (t,u,x) coordinate system, for example, by forming a vertex surface for each of a plurality of vertices of the primitive exemplified in the description of FIG. 2. Consistent with such an embodiment, the (t,u,x) coordinate system includes a (t,u) rectangle extending across the x-dimensional space of the (t,u,x) coordinate system. Further exemplary of this embodiment, operation 604 includes the additional operations of determining a minimum x-coordinate and a maximum x-coordinate at each of the four corners of the (t,u) rectangle, fitting a plane to the minimum x-coordinates to form a lower (t,u,x) bounding plane, and fitting a plane to the maximum x-coordinates to form a upper (t,u,x) bounding plane. Further exemplary of this embodiment, each sample point includes indices in the (t,u,x) coordinate system, wherein operation 606 includes the operation of excluding from testing one or more sample points having an index which does not lie between the lower (t,u,x) bounding plane and the upper (t,u,x) bounding plane.

In a second exemplary embodiment of operation 602, a trajectory is constructed of one or more vertices of the primitive in a (t,v,y) coordinate system, for example, by forming a vertex surface for each of a plurality of vertices of the primitive exemplified in the description of FIG. 3. Consistent with this embodiment, the (t,v,y) coordinate system includes a (t,v) rectangle extending across the y-dimensional space of the (t,v,y) coordinate system. Further exemplary of this embodiment, operation 604 includes the additional operations of determining a minimum y-coordinate and a maximum y-coordinate at each of the four corners of the (t,v) rectangle, fitting a plane to the minimum y-coordinates to form a lower (t,v,y) bounding plane, and fitting a plane to the maximum y-coordinates to form a upper (t,v,y) bounding plane. Further exemplary of this embodiment, each sample point includes indices in the (t,v,y) coordinate system, wherein operation 606 includes the operation of excluding from testing one or more sample points having an index which does not lie between the lower (t,v,y) bounding plane and the upper (t,v,y) bounding plane.

Exemplary, the method 600 is carried out for each of a plurality of primitives in order to improve the sample test efficiency for determining the color/transparency/reflectance of a tile (e.g., a pixel) which is overlapped by the plurality of primitives. Further exemplary, multiple primitives overlapping a particular region/pixel may be processed in parallel, whereby multiple instances of operations 602 and 604 (one instance for each primitive) are carried out concurrently.

In an exemplary application, the method of FIG. 6 is carried out as a part of a graphics pipeline process, e.g, as a part of a pixel shader program executed to compute the color/transmittance/reflectance of the screen space region, e.g., a fragment or a pixel. Execution time of the shader program is shortened due to the smaller number of samples tested, and as such the shader is able to compute the pixel's color faster without loss of accuracy. Further exemplary, the operations described in FIG. 6 may be performed in hardware, using e.g., an application specific integrated circuit (ASIC) or other circuit which is able to be configured to carry out the describe operations.

Figure 7:
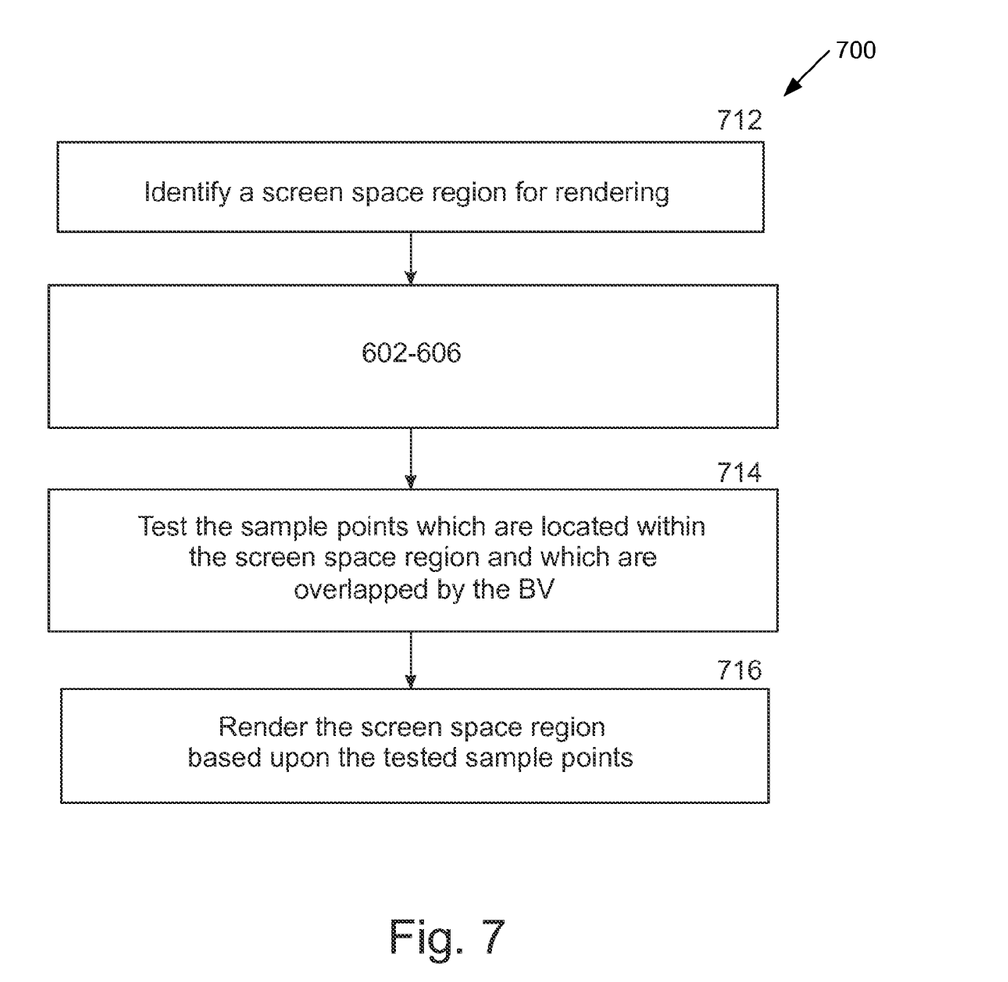
FIG. 7 illustrates an exemplary method for rendering a region of an image in accordance with the present invention.

FIG. 7 illustrates a method for rendering a region of an image which incorporates method 600. At 712, a screen space region which is to be rendered is identified. This process may be performed automatically during image rendering, as successive regions (e.g., pixels) of an image which is to be rendered are selected one after another, or it may occur manually, for example, if the viewer manually selects a region which is to be viewed. The method 700 continues with the implementation of operations 602, 604 and 606 as described, and implemented in accordance with one or more of the exemplary embodiments described herein. At 714, the samples which are located within the screen space region, and which are overlapped by the bounding volume of the primitive are tested. At 716, the screen space region of the image is rendered based upon the tested samples. Exemplary embodiments of operation 716 include implementing a shader program operable to compute the color/transmittance/reflectance of the screen space region based upon the tested samples within that region and overlapped by the bounding volume. Further exemplary, the method 700 is repeated one or more times to render multiple regions of the image or the entire image. As used herein, the term "render" refers to the output of the screen space region/image in a visually comprehensible format (e.g., displayed on a monitor, printed on a medium, etc.), as well as the process of storing the data corresponding to such a region/image in electronic form, e.g. in a render target, such as a frame buffer.

Figure 8:
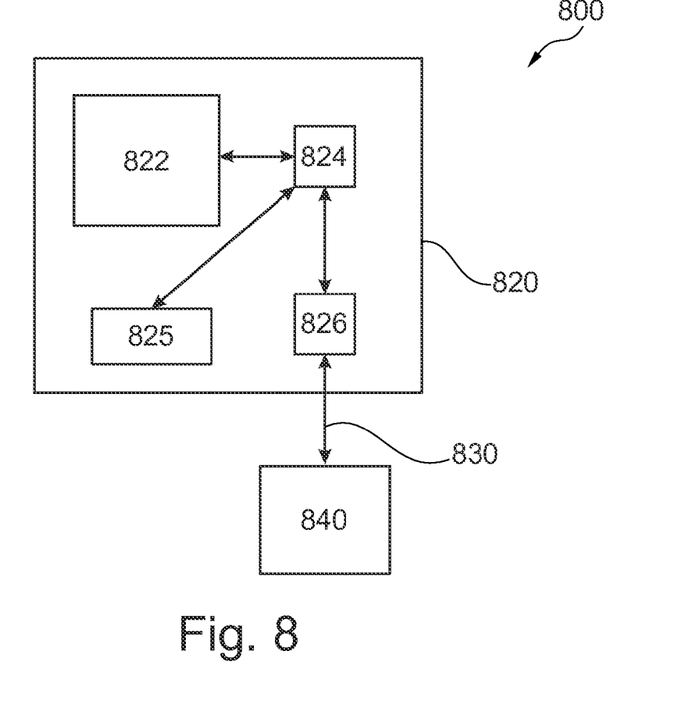
FIG. 8 illustrates an exemplary system in which the methods described for FIGS. 1A-7 finds utility in accordance with the present invention.

FIG. 8 illustrates an exemplary system 800 in which the methods described for FIGS. 1A-7 finds utility in accordance with the present invention. The system 800, exemplary a computer system, includes a graphics processing sub-system 820 and an output device 840, such as a monitor or printer. The graphics processing sub-system 820 includes a processor 822, a memory interface 824, a frame buffer 825, and a scanout processor 826. The processor 822 is operable to perform any or all of the operations described for FIGS. 1A-7 herein, and is a parallel processing architecture in an exemplary embodiment. A frame buffer 826 is operably coupled to the processor 822 for receiving rasterized and/or raytraced fragment values for each frame, and for reading out a composite image of each frame to the output device 840 via memory interface 824 and link 830 (e.g., a DVI link). In a specific embodiment, the processor 822 is operable to carry out one, several, or all of the operations described for any one, several or more of FIGS. 1A-7. Further, the processor 822 may include local memory operable to store instruction code for performing the methods described in FIGS. 1A-7. In an alternative embodiment, system 800 may take on different forms (e.g., a personal digital assistant, an internet device, a mobile telephone, or other mobile device), and processor 820 may be an embedded in such different systems. Further alternatively, the processor 822 may take the form of an application specific integrated circuit or other hardware/firmware circuit operable to carry out the operations described for any one, several, or all of FIGS. 1A-7.

In one embodiment, system 800 is operable to reduce the number of samples tested for rendering a region of an image in accordance with the present invention. In this embodiment, the system 800 includes a processor 822 operable to perform one or more of the operations described for FIG. 6, and one or more of the operations described for FIG. 7.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 822 or globally within system 800) is operable to store instructions for performing any of the operations described for FIGS. 1A-7. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

Figure 9:
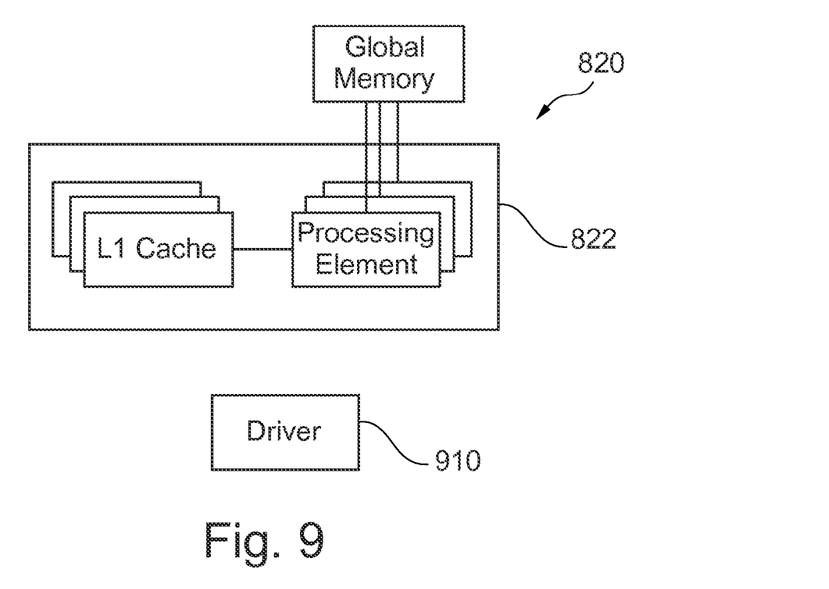
FIG. 9 illustrates an exemplary graphics processing subsystem shown in FIG. 8 in accordance with the present invention.

FIG. 9 illustrates an exemplary graphics processing subsystem 820 of FIG. 8 in accordance with the present invention. The graphics processing sub-system 820 includes parallel processing elements and their associated local L1 caches, as well as a global memory block which is operable to store instructions for carrying out the methods described for FIGS. 1A-7. The sub-system 820 may further include one or more drivers 910 for controlling the operation of the sub-system 820 in accordance with the methods described herein. In one embodiment, the sub-system 820 is included within in a graphics card. In another embodiment, the sub-system 820 is included within the motherboard of a computer or workstation or on a game console. In another embodiment, the sub-system 820 is realized in an embedded system, such as in a cellular telephone.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for reducing the number of sample points tested for rendering a screen space tile of an image, the method comprising:
constructing a trajectory of a primitive in a three dimensional coordinate system comprising a screen space dimension, a lens dimension, and a time dimension;
determining low and high bounding planes in the three dimensional coordinate system for the screen space tile of the image by using three dimensional points of the trajectory of the primitive;
constructing a bounding volume for the screen space tile which is to be rendered by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile; and
excluding from testing, one or more sample points which are located within the screen space tile, and which are not overlapped by the bounding volume.

2. The method of claim 1, wherein said constructing a trajectory comprises
constructing a trajectory of one or more vertices of the primitive in a (t,u,x) coordinate system.

3. The method of claim 2,
wherein the (t,u,x) coordinate system includes a (t,u) rectangle extending across the x-dimensional space of the (t,u,x) coordinate system, and
wherein said constructing a bounding volume comprises:
determining a minimum x-coordinate and a maximum x-coordinate at each of the four corners of the (t,u) rectangle;
fitting a plane to the minimum x-coordinates to form a lower (t,u,x) bounding plane; and
fitting a plane to the maximum x-coordinates to form a upper (t,u,x) bounding plane.

4. The method of claim 3, wherein each sample point comprises indices in the (t,u,x) coordinate system, and wherein said excluding from testing comprises
excluding from testing one or more sample points having an index which does not lie between the lower (t,u,x) bounding plane and the upper (t,u,x) bounding plane.

5. The method of claim 1, wherein said constructing a trajectory comprises
constructing a trajectory of one or more vertices of the primitive in a (t,v,y) coordinate system.

6. The method of claim 5,
wherein the (t,v,y) coordinate system includes a (t,v) rectangle extending across the y-dimensional space of the (t,v,y) coordinate system, and
wherein said constructing a bounding volume comprises:
determining a minimum y-coordinate and a maximum y-coordinate at each of the four corners of the (t,v) rectangle;
fitting a plane to the minimum y-coordinates to form a lower (t,v,y) bounding plane; and
fitting a plane to the maximum y-coordinates to form a upper (t,v,y) bounding plane.

7. The method of claim 6, wherein each sample point comprises indices in the (t,v,y) coordinate system, and wherein said excluding from testing comprises
excluding from testing one or more sample points having an index which does not lie between the lower (t,v,y) bounding plane and the upper (t,v,y) bounding plane.

8. A method for rendering a screen space tile of an image, comprising:
identifying a screen space tile which is to be rendered;
constructing a trajectory of a primitive in a three dimensional coordinate system comprising a screen space dimension, a lens dimension, and a time dimension;
determining low and high bounding planes in the three dimensional coordinate system for the screen space tile of the image by using three dimensional points of the trajectory of the primitive;
constructing a bounding volume for the screen space tile by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile;

excluding from testing, one or more sample points which are located within the screen space tile, and which are not overlapped by the bounding volume;

testing the sample points which are located within the screen space tile and which are overlapped by the bounding volume; and rendering the screen space tile of the image based upon the tested sample points.

9. The method of claim 8, wherein said constructing a trajectory comprises constructing a trajectory of one or more vertices of the primitive in a (t,u,x) coordinate system.

10. The method of claim 9, wherein the (t,u,x) coordinate system includes a (t,u) rectangle extending across the x-dimensional space of the (t,u,x) coordinate system, and wherein said constructing a bounding volume comprises:
determining a minimum x-coordinate and a maximum x-coordinate at each of the four corners of the (t,u) rectangle;
fitting a plane to the minimum x-coordinates to form a lower (t,u,x) bounding plane; and
fitting a plane to the maximum x-coordinates to form a upper (t,u,x) bounding plane.

11. The method of claim 10, wherein each sample point comprises indices in the (t,u,x) coordinate system, and wherein said excluding from testing comprises excluding from testing one or more sample points having an index which does not lie between the lower (t,u,x) bounding plane and the upper (t,u,x) bounding plane.

12. The method of claim 8, wherein said constructing a trajectory comprises constructing a trajectory of one or more vertices of the primitive in a (t,v,y) coordinate system.

13. The method of claim 12, wherein the (t,v,y) coordinate system includes a (t,v) rectangle extending across the y-dimensional space of the (t,v,y) coordinate system, and wherein said constructing a bounding volume comprises:
determining a minimum y-coordinate and a maximum y-coordinate at each of the four corners of the (t,v) rectangle;
fitting a plane to the minimum y-coordinates to form a lower (t,v,y) bounding plane; and
fitting a plane to the maximum y-coordinates to form a upper (t,v,y) bounding plane.

14. The method of claim 13, wherein each sample point comprises indices in the (t,v,y) coordinate system, and wherein said excluding from testing comprises excluding from testing one or more sample points having an index which does not lie between the lower (t,v,y) bounding plane and the upper (t,v,y) bounding plane.

15. A system operable to reduce the number of sample points tested for rendering a screen space tile of an image, the system including a processor operable to:

construct a trajectory of a primitive in a three dimensional coordinate system comprising a screen space dimension, a lens dimension, and a time dimension;

determine low and high bounding planes in the three dimensional coordinate system for the screen space tile of the image by using three dimensional points of the trajectory of the primitive;

construct a bounding volume for the screen space tile which is to be rendered by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile; and exclude from testing, one or more sample points which are located within the screen space tile, and which are not overlapped by the bounding volume.

16. The system of claim 15, wherein in accordance with the processor operable to construct a trajectory, the processor is operable to construct a trajectory of one or more vertices of the primitive in either a (t,u,x) coordinate system.

17. The system of claim 16, wherein the (t,u,x) coordinate system includes a (t,u) rectangle extending across the x-dimensional space of the (t,u,x) coordinate system, and wherein in accordance with the processor operable to construct a bounding volume, the processor is operable to:
determine a minimum x-coordinate and a maximum x-coordinate at each of the four corners of the (t,u) rectangle;
fit a plane to the minimum x-coordinates to form a lower (t,u,x) bounding plane; and
fit a plane to the maximum x-coordinates to form a upper (t,u,x) bounding plane.

18. The system of claim 17, wherein each sample point comprises indices in the (t,u,x) coordinate system, and wherein in accordance with the processor operable to exclude from testing, the processor is operable to exclude from testing one or more sample points having an index which does not lie between the lower (t,u,x) bounding plane and the upper (t,u,x) bounding plane.

19. The system of claim 15, wherein in accordance with the processor operable to construct a trajectory, the processor is operable to constructing a trajectory of one or more vertices of the primitive in a (t,v,y) coordinate system.

20. The system of claim 19, wherein the (t,v,y) coordinate system includes a (t,v) rectangle extending across the y-dimensional space of the (t,v,y) coordinate system, and wherein in accordance with the processor operable to construct a bounding volume, the processor is operable to:
determine a minimum y-coordinate and a maximum y-coordinate at each of the four corners of the (t,v) rectangle;
fit a plane to the minimum y-coordinates to form a lower (t,v,y) bounding plane; and
fit a plane to the maximum y-coordinates to form a upper (t,v,y) bounding plane.

21. The system of claim 20, wherein each sample point comprises indices in the (t,v,y) coordinate system, and wherein in accordance with the processor operable to exclude from testing, the processor is operable to exclude from testing one or more sample points having an index which does not lie between the lower (t,v,y) bounding plane and the upper (t,v,y) bounding plane.

22. A system operable to render a screen space tile of an image, the system including a processor operable to:

identify a screen space tile which is to be rendered;

construct a trajectory of a primitive in a three dimensional coordinate system comprising a screen space dimension, a lens dimension, and a time dimension;

determine low and high bounding planes in the three dimensional coordinate system for the screen space tile of the image by using three dimensional points of the trajectory of the primitive;

construct a bounding volume for the screen space tile by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile;

exclude from testing, one or more sample points which are located within the screen space tile, and which are not overlapped by the bounding volume;

test the sample points which are located within the screen space tile and which are overlapped by the bounding volume; and render the screen space tile of the image based upon the tested sample points.

23. The system of claim 22, wherein in accordance with the processor operable to construct a trajectory, the processor is operable to construct a trajectory of one or more vertices of the primitive in either a (t,u,x) coordinate system.

24. The system of claim 23,
wherein the (t,u,x) coordinate system includes a (t,u) rectangle extending across the x-dimensional space of the (t,u,x) coordinate system, and
wherein in accordance with the processor operable to construct a bounding volume, the processor is operable to:
determine a minimum x-coordinate and a maximum x-coordinate at each of the four corners of the (t,u) rectangle;
fit a plane to the minimum x-coordinates to form a lower (t,u,x) bounding plane; and
fit a plane to the maximum x-coordinates to form a upper (t,u,x) bounding plane.

25. The system of claim 24, wherein each sample point comprises indices in the (t,u,x) coordinate system, and wherein in accordance with the processor operable to exclude from testing, the processor is operable to exclude from testing one or more sample points having an index which does not lie between the lower (t,u,x) bounding plane and the upper (t,u,x) bounding plane.

26. The system of claim 22, wherein in accordance with the processor operable to construct a trajectory, the processor is operable to constructing a trajectory of one or more vertices of the primitive in a (t,v,y) coordinate system.

27. The system of claim 26,
wherein the (t,v,y) coordinate system includes a (t,v) rectangle extending across the y-dimensional space of the (t,v,y) coordinate system, and
wherein in accordance with the processor operable to construct a bounding volume, the processor is operable to:
determine a minimum y-coordinate and a maximum y-coordinate at each of the four corners of the (t,v) rectangle;
fit a plane to the minimum y-coordinates to form a lower (t,v,y) bounding plane; and
fit a plane to the maximum y-coordinates to form a upper (t,v,y) bounding plane.

28. The system of claim 27, wherein each sample point comprises indices in the (t,v,y) coordinate system, and wherein in accordance with the processor operable to exclude from testing, the processor is operable to exclude from testing one or more sample points having an index which does not lie between the lower (t,v,y) bounding plane and the upper (t,v,y) bounding plane.

29. A computer program product, resident on a non-transitory computer-readable medium, and operable to store instructions for reducing the number of sample points tested for rendering a screen space tile of an image, the computer program product comprising:
instruction code for constructing a trajectory of a primitive in a three dimensional coordinate system comprising a screen space dimension, a lens dimension, and a time dimension;
instruction code for determining low and high bounding planes in the three dimensional coordinate system for the screen space tile of the image by using three dimensional points of the trajectory of the primitive;
instruction code for constructing a bounding volume for the screen space tile which is to be rendered by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile; and
instruction code for excluding from testing, one or more sample points which are located within the screen space tile, and which are not overlapped by the bounding volume.

30. A computer program product, resident on a non-transitory computer-readable medium, and operable to store instructions for rendering a screen space tile of an image, the computer program product comprising:
instruction code for identifying a screen space tile which is to be rendered;
instruction code for constructing a trajectory of a primitive in a three dimensional coordinate system comprising a screen space dimension, a lens dimension, and a time dimension;
determining low and high bounding planes in the three dimensional coordinate system for the screen space tile of the image by using three dimensional points of the trajectory of the primitive;
instruction code for constructing a bounding volume for the screen space tile by using the low and high bounding planes in the three dimensional coordinate system for the screen space tile, wherein the bounding volume extends between the low and high bounding planes in the three dimensional coordinate system that are determined as a function of the trajectory of the primitive, and wherein the bounding volume overlaps a portion of the screen space tile;
instruction code for excluding from testing, one or more sample points which are located within the screen space tile, and which are not overlapped by the bounding volume;
instruction code for testing the sample points which are located within the screen space tile and which are overlapped by the bounding volume; and
instruction code for rendering the screen space tile of the image based upon the tested sample points.

* * * * *